United States Patent
Kihara et al.

[11] Patent Number: 5,949,559
[45] Date of Patent: Sep. 7, 1999

[54] METHOD AND APPARATUS FOR CREATING HOLOGRAPHIC STEREOGRAM

[75] Inventors: Nobuhiro Kihara; Akira Shirakura, both of Kanagawa; Shigeyuki Baba, Tokyo, all of Japan

[73] Assignee: Sony Corporation, Japan

[21] Appl. No.: 08/882,272

[22] Filed: Jun. 25, 1997

[30] Foreign Application Priority Data

Jul. 2, 1996 [JP] Japan .................................. 8-172382

[51] Int. Cl.⁶ ....................................................... G03H 1/26
[52] U.S. Cl. .................... 359/23; 359/22; 359/28; 359/30
[58] Field of Search .................... 359/22, 23, 28, 359/30

[56] References Cited

FOREIGN PATENT DOCUMENTS 62-203186   9/1987   Japan .
6-175570    6/1994   Japan .................... 359/23

*Primary Examiner*—Cassandra Spyrou
*Assistant Examiner*—Darren E. Schuberg
*Attorney, Agent, or Firm*—Rader, Fishman & Grauer; Ronald P. Kananen

[57] ABSTRACT

A method and an apparatus for creating a holographic stereogram are provided for canceling noises localized to infinity and offering a high-quality hologram. The creating method is executed to display an image corresponding to a coordinate location on the hologram recording medium on the display unit, condense the laser beam transmitted through the display unit as an object beam at the coordinate location of the hologram recording medium, and apply part of the laser beam before transmission through the display unit as a reference beam onto the hologram recording medium, for sequentially forming stripped or dotted holographic elements on the hologram recording medium. The creating apparatus includes a first diffuser panel located close to the display unit, a mask, and a second diffuser panel, the latter two of which are located immediately before the hologram recording medium. The mask has an opening corresponding to the width of the holographic element. The second diffuser panel serves to one-dimensionally diffuse the object beam transmitted through the opening of the mask. The first diffuser panel is relocated at the exposure of each holographic element.

10 Claims, 5 Drawing Sheets

METHOD AND APPARATUS FOR CREATING HOLOGRAPHIC STEREOGRAM

BACKGROUND OF THE INVENTION

1. Field of the Invention

The present invention relates to a method and an apparatus for creating a holographic stereogram for three-dimensionally recognizing a real image or a computer-created image.

2. Description of Prior Art

In general, for creating the holographic stereogram, lots of original images obtained by sequentially imaging an object from variable observatory views are recorded on one hologram recording medium as striped or dotted holographic elements. For example, as shown in FIG. 1, the holographic stereogram having only horizontal parallax information includes a plurality of original images 101a to 101e obtained by sequentially imaging an object 100 from variable observatory points in the horizontal direction on a hologram recording medium 102 as striped holographic elements.

When a person watches this holographic stereogram at a certain location with his or her one eye, he or she can watch a two-dimensional image that is a set of image information of one portion of each holographic element. When the person moves his or her eye location in the horizontal direction, he or she can watch another two-dimensional image that is a set of image information of another portion of each holographic element. Hence, when the person watches this holographic stereogram with his or her eyes, since the locations of his or her right and left eyes are slightly different from each other, the two-dimensional image appearing on the right eye is slightly different from the two-dimensional image appearing on the left eye. This slight difference offers the person with the parallax, so that the person can recognize the holographic stereogram as a three-dimensional image.

In creating the holographic stereogram, a laser beam with excellent interference are divided into two parts, one of which is a projected image (object beam) two-dimensionally modulated by an image display unit (for example, a LCD panel) and the other one of which is a reference beam. Both of the beams are condensed on each holographic element, that is a portion of a hologram recording medium composed of a sensitive material served. Then, an interference pattern is recorded as change of a refractive index of the photosensitive material at a holographic element. Each holographic elements are formed with above-mentioned process.

In order to obtain the high-quality hologram, it is effective to locate a diffuser panel close to the image display unit.

However, the location of the diffuser panel makes it impossible to cancel the noises of the resulting hologram localized to infinity.

SUMMARY OF THE INVENTION

The present invention is proposed in consideration of the foregoing conventional conditions, and it is an object of the present invention to provide a method and an apparatus for creating a holographic stereogram which method and apparatus enable to cancel the noises localized to infinity and thereby to offer a high-quality hologram.

In carrying out the object, according to an aspect of the present invention, a method for creating a holographic stereogram includes the steps of displaying an image corresponding a coordinate location of the hologram recording medium on a display unit, condensing a laser beam transmitted through the display unit as an object beam on the coordinate location of the hologram recording medium and applying part of the laser beam before transmission through the display unit as a reference beam onto the hologram recording medium, and sequentially forming stripped or dotted holographic elements on the hologram recording medium, wherein a first diffuser panel for diffusing a laser beam is located close to the display unit and a mask and a second diffuser panel are located immediately before the hologram recording medium, a mask having an opening corresponding to each holographic element shape and a second diffuser panel for one-dimensionally diffusing the object beam transmitted through the opening, and the first diffuser panel is optionally moved at each time of forming holographic element.

According to another aspect of the invention, an apparatus for creating a holographic stereogram includes a display unit for displaying an image Corresponding to a coordinate location of the hologram recording medium, a laser beam source for applying a laser beam transmitted through the display unit as an object beam onto a hologram recording medium and part of the laser beam before transmission through the display unit as a reference beam onto the hologram recording medium, a first diffuser panel located close to the display unit and for diffusing the laser beam, means for moving the first diffuser panel at each time of forming holographic element, a mask having an opening corresponding to a shape of the holographic element, the mask located immediately before the hologram recording medium, and a second diffuser panel for one-dimensionally diffusing the object beam transmitted through the opening of the mask.

According to another aspect of the invention, the first diffuser panel serves to properly diffuse the object beam in the width direction of the holographic element and the mask serves to screen the unnecessary object beam. At this time, the diffuser panel is not fixed but movable at the exposure of each holographic element. Hence, the un-uniformity of the optical system is diffused and the exposure of each holographic element is made more uniform. At a time, the noises localized to infinity are canceled.

As mentioned above, the method and the apparatus according to the present invention enable to cancel the noises localized to infinity and thereby offer the high-quality holographic stereogram.

Further objects and advantages of the present invention will be apparent from the following description of the preferred embodiments of the invention as illustrated in the accompanying drawings.

BRIEF DESCRIPTION OF THE DRAWINGS

In order that the invention may be readily carried into effect, it will now be described with reference to the accompanying drawings, wherein:

FIG. 5, comprising

DESCRIPTION OF THE PREFERRED EMBODIMENTS

Hereafter, the description will be oriented to concrete embodiments of the present invention with reference to the appended drawings. It goes without saying that the present invention is not limited to the following embodiments and thus may be changed in form without having to depart from the spirit of the invention.

At first, the description will be oriented to an arrangement of a system for creating a holographic stereogram according to an embodiment of the present invention. This embodiment is concerned with a holographic stereogram provided with horizontal parallax information by recording a plurality of stripped holographic elements on one recording medium. In actual, however, it is apparent that the present invention may be applied to the holographic stereogram provided with horizontal and vertical parallax information by recording a plurality of dotted holographic elements on one recording medium.

Figure 1:
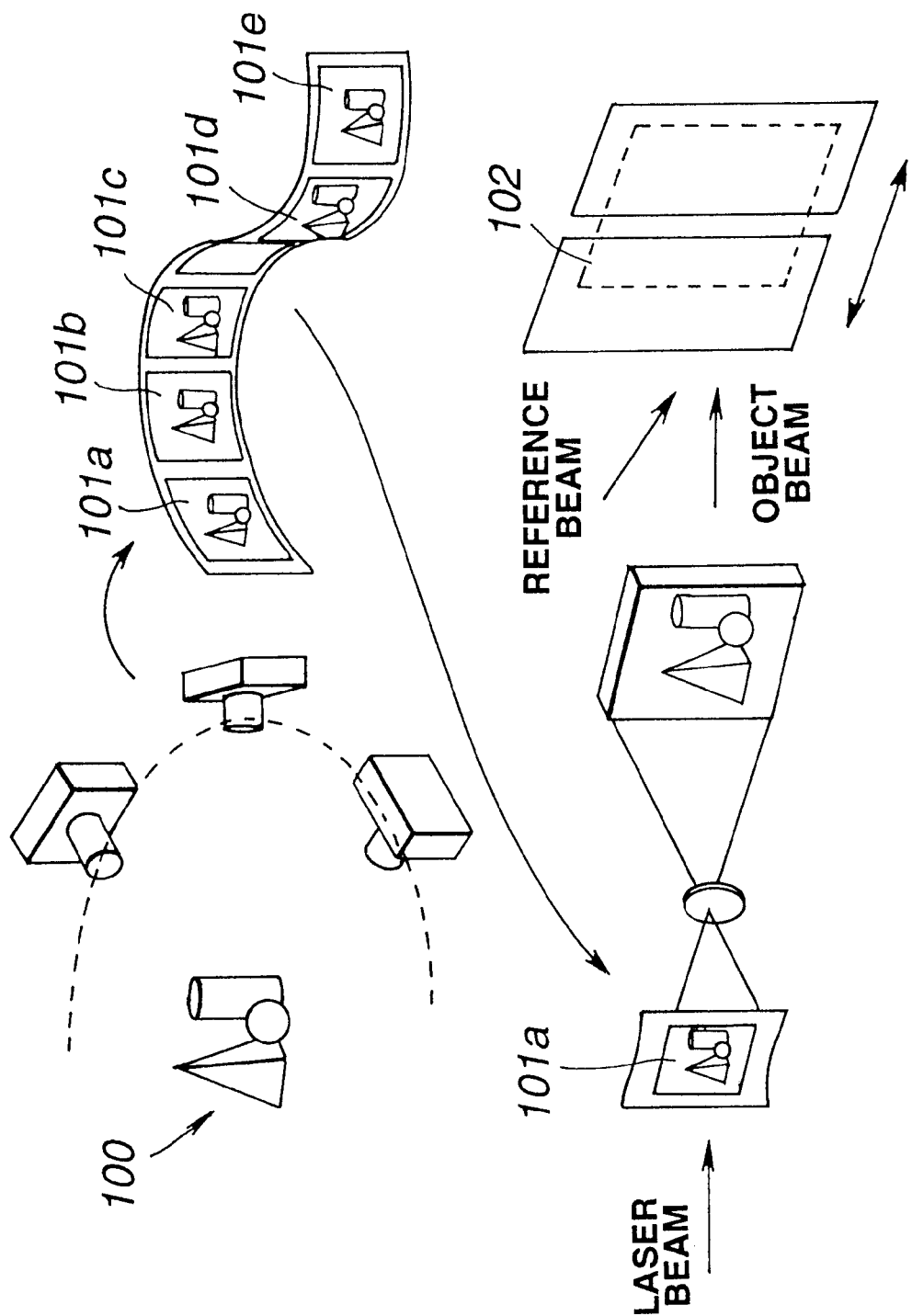
FIG. 1 is a model view showing a method for creating a holographic stereogram.
Figure 2:
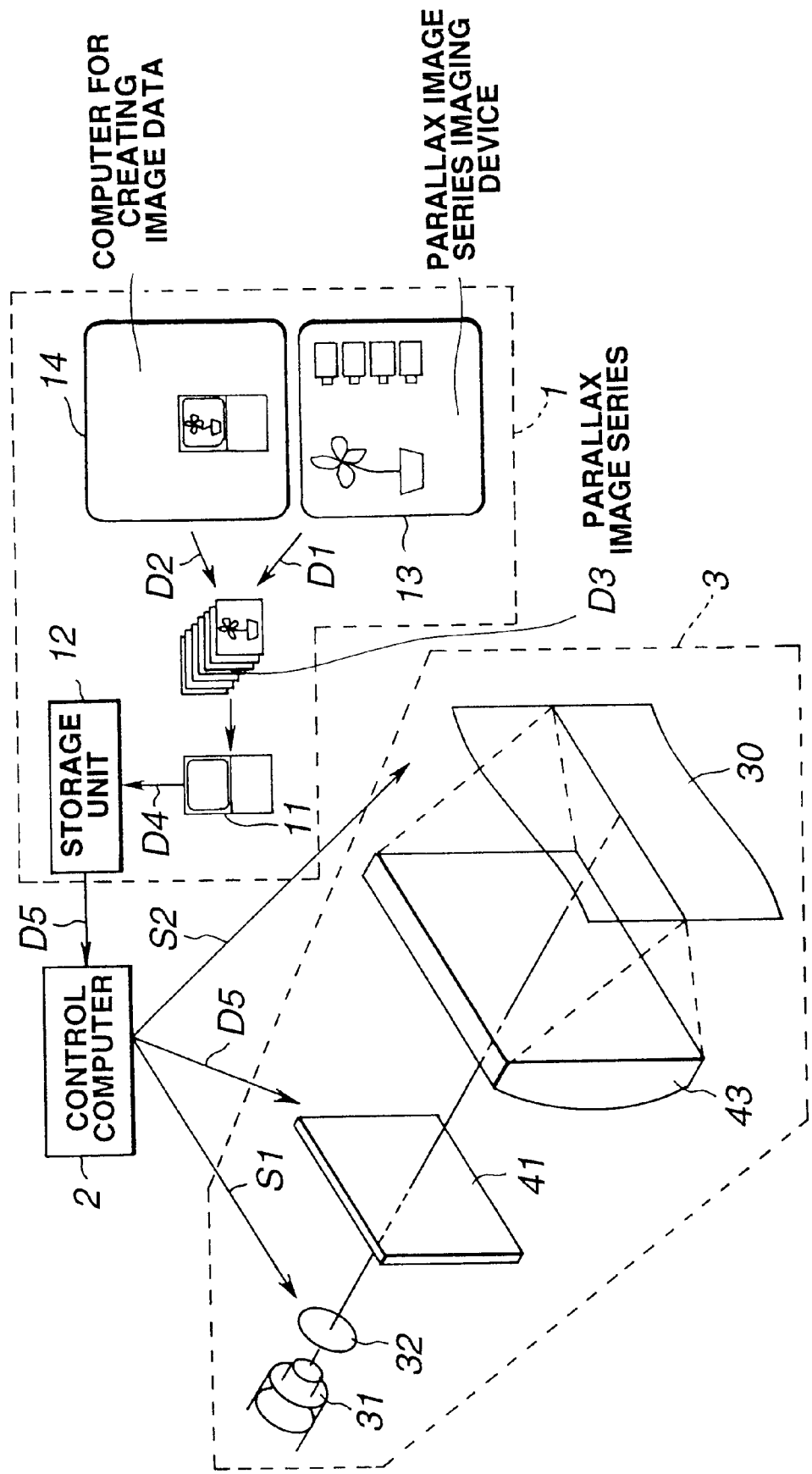
FIG. 2 is a model view showing an arrangement of a system for creating a holographic stereogram.

The present system is a system for creating a so-called one-step holographic stereogram which directly corresponds to the hologram recording medium where an interference pattern of the object beam and the reference beam is recorded. As shown in FIG. 2, the system is arranged to have a data processing unit 1 for processing image data to be recorded, a control computer 2 for controlling an overall system, and a holographic stereogram printer apparatus 3 having an optical system for creating a holographic stereogram.

The data processing unit 1 operates to create parallax image series D3, based on a plurality of pieces of image data D1 containing the parallax information supplied from a parallax image series imaging device 13 provided with a multiple-lens camera, a movable camera or the like or a plurality of pieces of image data D2 containing parallax information created by a computer 14 for generating image data.

The plurality of pieces of image data D1 containing the parallax information supplied form the parallax image series imaging device 13 indicate image data composed of plural images obtained by imaging a real object from different kinds of observatory points in the horizontal direction by means of the concurrent imaging with the multiple-lens camera or the sequential imaging with the movable camera.

The plurality of pieces of image data D2 containing the parallax information created by the computer 14 indicate CAD (Computer-aided design) images or CG (Computer graphics) images created by providing sequential parallax in the horizontal direction.

Then, the data processing unit 1 performs a given image treatment for the holographic stereogram of the parallax image series D3 through the effect of an image processing computer 11. Then, the treated image data D4 is recorded in the recording unit 12 such as a memory or a hard disk.

Further, when recording the image on the hologram recording medium, the data processing unit 1 operates to sequentially read the data one image by one image from the image data D4 recorded in the recording unit 12 and send out the image data D5 to the control computer 2.

On the other hand, the control computer 2 operates to drive the holographic stereogram printer apparatus 3 so that the images of the image data D5 supplied form the data processing unit 1 are sequentially recorded in the hologram recording medium 30 located in the printer apparatus 3 as striped holographic elements.

At this time, as will be described below, the control computer 2 controls a shutter 32, a display unit 41, a recording medium feeding mechanism and the other components located in the printer apparatus 3. Specifically, the control computer 2 operates to send out a control signal S1 to the shutter 32 for controlling the opening or closing of the shutter 32 and supply the image data D5 to the display unit 41 so that the image of the image data D5 is displayed on the display unit 41. Further, the computer 2 also sends out a control signal S2 to the recording medium feeding mechanism for controlling the feeding operation of the mechanism.

Figure 3A:
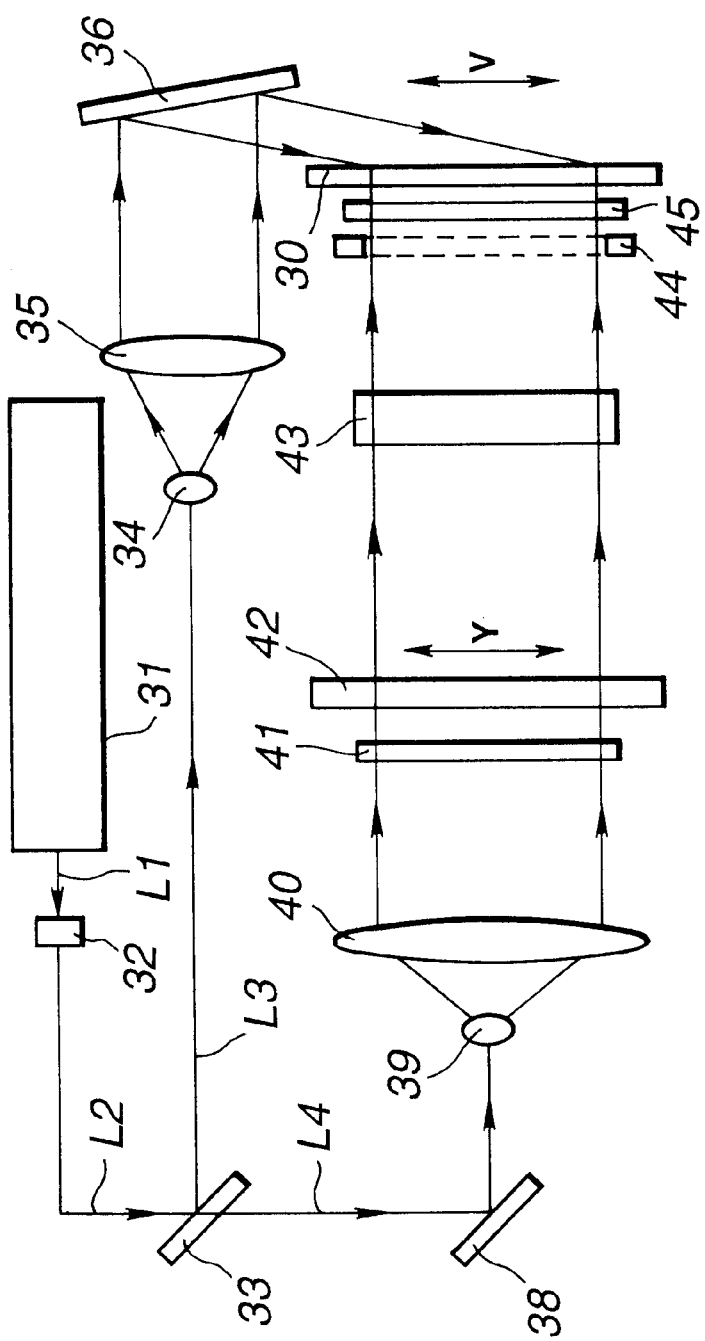
FIGS. 3A and 3B are top and side views, respectively, showing an optical system located in a holographic stereogram printer apparatus.
Figure 3B:
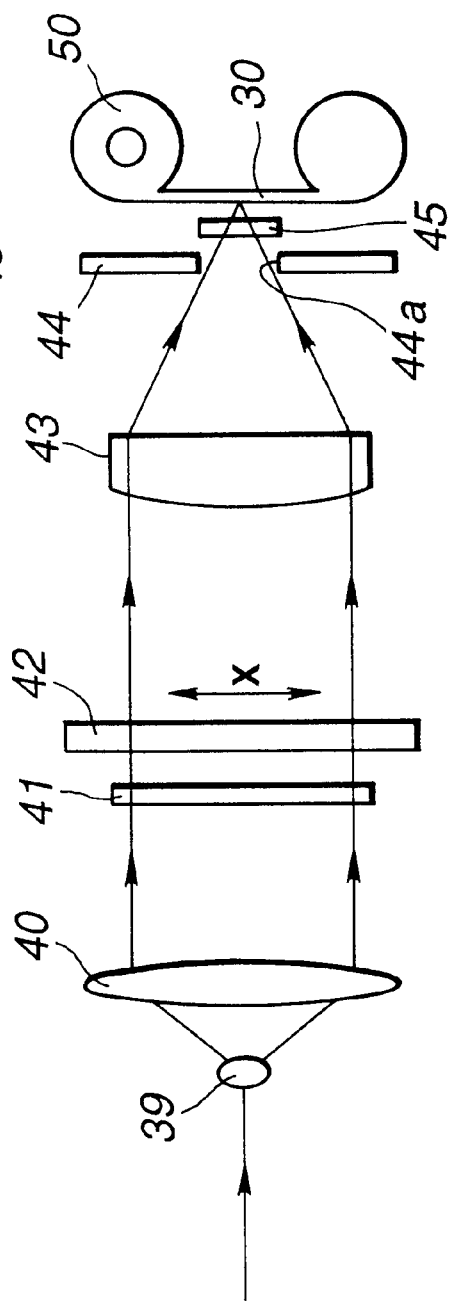

The holographic stereogram printer apparatus 3 will be discussed in detail with reference to FIG. 3. FIG. 3A shows an optical system of the overall printer apparatus 3 viewed from the top, while FIG. 3B shows a portion for the object beam of an optical system of the printer apparatus 3 viewed from the lateral direction.

As shown in FIG. 3A, the printer apparatus 3 includes a laser beam source 31 for firing a laser beam having a given wavelength, the shutter 32, and a half mirror 33, the latter two of which are located on an optical axis of a laser beam L1 fired by the laser beam source 31. In this embodiment, the laser beam source 31 employs an argon laser having a wavelength of 514.5 nm and an output of 200 mW.

The shutter 32 is controlled by the control computer 2. The shutter 32 is closed when the hologram recording medium 30 is not exposed or opened when the medium 30 is exposed. The half mirror 33 serves to separate the laser beam L2 transmitted through the shutter 32 into the reference beam and the object beam. The beam L3 reflected on the half mirror 33 is the reference beam. The beam L4 transmitted through the half mirror 33 is the object beam.

In the optical system, the optical path of the reference beam reflected on the half mirror 33 and entered into the hologram recording medium 30 has the substantially same length as the optical path of the object beam transmitted through the half mirror 33 and entered into the hologram recording medium 30. The similarity of the optical paths makes it possible to enhance the interference between the reference beam and the object beam, thereby creating the holographic stereogram for offering a more vivid reproduced image.

On the optical axis of the beam L3 reflected on the half mirror 33, there are arranged a cylindrical lens 34, a collimator lens 35 for making the reference beam parallel, and a totally reflective mirror 36 in the describing order. Those components are for the optical system for the reference beam.

The beam reflected on the half mirror 33 is converted into diffuse light emitted from a point light source through the effect of the cylindrical lens 34. Then, the diffuse light is converted into the parallel light through the collimator lens 35. Next, the parallel light is reflected on the totally reflective mirror 36 and then is entered into the hologram recording medium 30.

On the other hand, on the optical axis of the beam L4 transmitted through the half mirror 33, as shown in FIGS. 3A and 3B, there are arranged as an optical system for the object beam a totally reflective mirror 38 for reflecting the transmitted beam from the half mirror 33, a spatial filter 39 composed of a convex lens and a pin hole combined therewith, a collimator lens 40 for making the object beam parallel, a display unit 41 for displaying an image of an object to be recorded, a one-dimensional diffuser panel 42 for diffusing the light transmitted through the display unit 41 in the width direction, a cylindrical lens 43 for condensing the object beam transmitted through the one-dimensional diffuser panel 42 onto the hologram recording medium 30, and a mask 44 having a striped opening corresponding to the width of the holographic element in the describing order.

For the reflective hologram, in general, the one-dimensional diffuser panel is located immediately before the hologram recording medium 30. In this embodiment, a one-dimensional diffuser panel 45 is located as a second diffuser panel between the mask 44 and the hologram recording medium 30.

This one-dimensional diffuser panel 45 serves to one-dimensionally diffuse the condensed object beam in the longitudinal direction of the striped holographic element. The diffuser panel 45 is used for movement of a view point in the vertical direction.

The beam L4 transmitted through the half mirror 33 is reflected on the totally reflective mirror 38 and then is converted into diffuse light emitted from a point light source through the effect of the spatial filter 39. Next, the diffuse light is converted into parallel light through the collimator lens 40. Next, the parallel light is entered into the display unit 41. In this embodiment, the spatial filter 40 is composed of an objective lens with a magnification of 20 times and a pin hole with a diameter of 20 µm. The collimator lens 40 has a focal distance of 100 mm.

The display unit 41 is a passive image display device composed of a LCD, for example, and is controlled by the control computer 2. The display unit 41 is controlled to display the image formed on the image data D5 sent from the control computer 2. In this embodiment, the used LCD is a monochrome LCD whose pixels consist of 480×1068 and whose size is 16.8 mm×29.9 mm.

The light transmitted through the display unit 41 is modulated by the image displayed on the display unit 41 and then is diffused through the one-dimensional diffuser panel 42. The one-dimensional diffuser panel 42 is just required to be located close to the display unit 41. The one-dimensional diffuser panel 42 is located immediately before or after the display unit 41. In this embodiment, it is located immediately after the display unit 41.

The diffuser panel 42 serves to slightly diffuse the transmitted light from the display unit 41 for diffusing the light inside of the holographic element. This greatly improves the image quality of the created holographic stereogram.

At this time, the diffuser panel 42 may be fixed. In place, the panel 42 may be moved randomly each time the holographic element is formed so that the panel 42 may be relocated at each holographic element. This relocation enables to reduce the noise localized to infinity when a person observes the hologram.

For the mechanism for moving the diffuser panel 42, it may be a mechanical moving mechanism, such as having stepping motor, for mechanically moving the diffuser panel 42 quantatively. The moving direction of the diffuser panel 42 may be the width direction of the holographic element (in the arrow X direction of FIG. 3B) or the direction perpendicular to the width direction (in the arrow Y direction of FIG. 3A). Moreover, the diffuser panel 42 may be moved combinationally in both directions or at random. In addition, the diffuser panel 42 may be reciprocated.

In this embodiment, the diffuser panel 42 is moved about 0.5 mm by 0.5 mm in the width direction (arrow X direction) of the holographic element. The movement of the diffuser panel 42 results in offering an excellent result. The movement may be smaller or greater than 0.5 mm. The movement may be optionally set in the range where the transmitted light of the display unit 41 is held inside of the diffuser panel 42.

As described above, the diffuser panel 42 allows the width inside of the holographic element to be uniformly exposed. This can improves the quality of the resulting hologram. For implementing the uniform exposure, the diffusing effect of the diffuser panel 42 is required to be intensified to some extent. However, the object beam diffused by a intensified diffuser panel is spread on the hologram recording medium 30 widely. This results in exposing a wider range than the original width of the holographic element.

Then, the mask 44 is used for screening the unnecessary light so that each holographic element may be properly exposed. That is, the diffusion done by the diffuser panel 42 and the screening of the unnecessary light through the mask 44 make it possible to obtain the uniform and proper exposure width.

That is, the light transmitted through the display unit 41 is transmitted through the diffuser panel 42 so that the light is diffused in the width direction of the holographic element. Then, the light is condensed onto the hologram recording medium through the effect of the cylindrical lens 43. The influence of the diffuser panel 42 does not allow the object beam to be condensed to one point or line but allows the object beam to be spread over a certain range.

Only the given range located in the center of the spread convergent light is transmitted through the opening 44a of the mask 44 and then is entered into the hologram recording medium 30 as the object beam.

The object beam is shaped like a stripe on the mask 44 or the hologram recording medium.

Between the mask 44 and the hologram recording medium 30, the one-dimensional diffuser panel 45 is located as a second diffuser panel. The object beam transmitted through the mask 44 is one-dimensionally diffused in the longitudinal direction of the striped holographic element and then is applied onto the hologram recording medium 30. This allows the angle of field of the reflective hologram to be spread in the vertical direction, that is the longitudinal direction of the holographic elements.

This one-dimensional diffuser panel 45 may be fixed but is preferably movable each time each holographic element is exposed for canceling the noises localized onto the hologram plane like the first diffuser panel 42. The diffuser panel 45 may be moved in any direction. Normally, the diffuser panel 45 is moved in the longitudinal direction (in the arrow V direction of the FIG. 3A) of the stripped holographic element for canceling the horizontal moire.

The holographic stereogram printer apparatus 3 provides a recording medium feeding mechanism 50 for intermittently feeding the hologram recording medium 30 by one holographic element under the control of the control computer 2. As will be described below, the recording medium feeding mechanism 50 is arranged to intermittently feed the film-shaped hologram recording medium in response to a control signal from the control computer 2. When the printer apparatus 3 creates the holographic stereogram, on the hologram recording medium 30 set to the recording medium feeding mechanism 50 in a given state, the printer apparatus 3 operates to sequentially record the image formed on each image data piece of the parallax image sequences as a stripped holographic element.

The hologram recording medium 30 used for the holographic stereogram creating system will be discussed in detail with reference to FIGS. 4 and 5.

Figure 4:
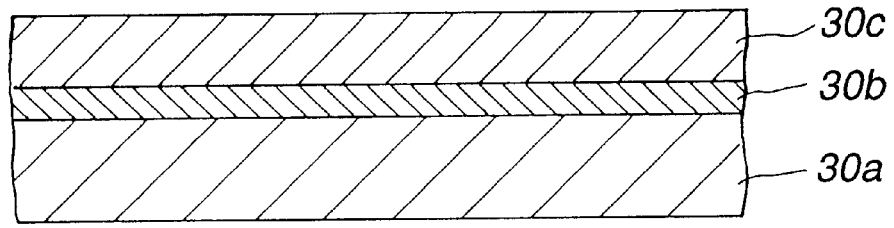
FIG. 4 is a section view showing an example of a hologram recording medium.

As shown in FIG. 4, this hologram recording medium 30 is a so-called film-coating recording medium, which is formed of a tape-shaped film base material 30a, a photopolymer layer 30b formed on the film base material 30a, and a cover sheet 30c coated on the photopolymer layer 30b. In this embodiment, the photopolymer 30b served as a photosensing portion employs a product "OMNI-DEX" manufactured by Dupon, Ltd. and has a thickness of about 20 μm.

Figure 5A:
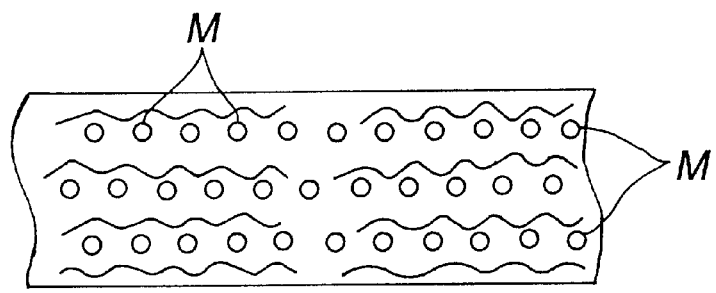
FIGS. 5A, 5B and 5C is a model view showing a photosensitive process of a photo-polymerization type photopolymer.
Figure 5B:
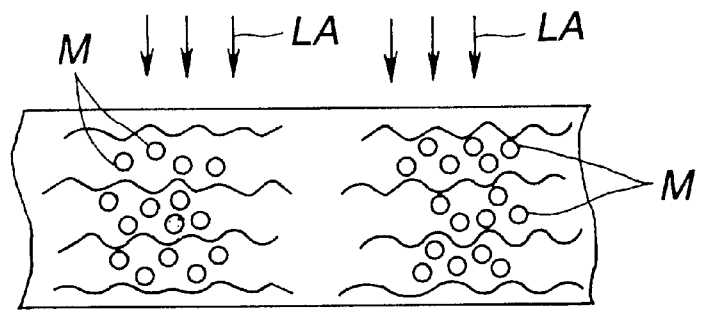
Figure 5C:
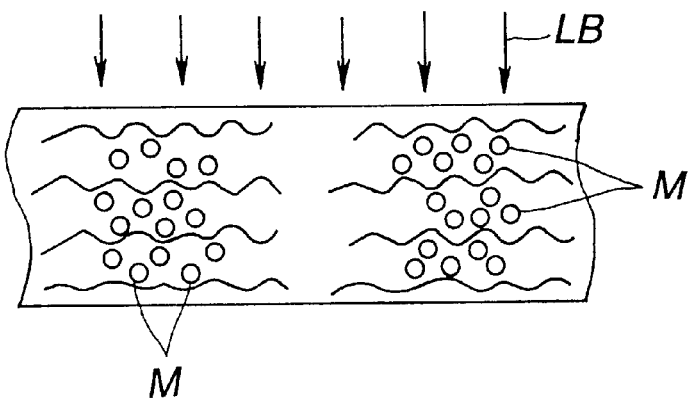

In the initial state, as shown in FIG. 5A, the photopolymer is composed of matrix polymer and monomer M uniformly dispersed therein. As shown in FIG. 5B, the beam LA with a power of 10 to 400 mJ/cm$^2$ is applied to the photopolymer, so that the monomer M is polymerized in the exposed portion. As the exposed portion is made more and more polymerized, the monomer M is moved from the area around the exposed portion so that the density of the monomer M is variable in any location. This brings about the modulation of the refractive index. Then, as shown in FIG. 5C, when an ultraviolet ray or visible light LB with a power of 1000 mw/cm$^2$ is applied onto the overall surface of the exposed portion, the polymerization of the monomer M is completed. The photopolymer changes the refractive index according to the incident light. Hence, the interference pattern caused by the interference between the reference beam and the object beam is allowed to be recorded as change of the refractive index.

The hologram recording medium 30 composed of such photopolymer does not need a special developing treatment after the exposure. Hence, the holographic stereogram printer apparatus 3 according to this embodiment for which is used the hologram recording medium 30 having the photopolymer as a photo-sensing portion may be simplified in construction.

Figure 6:
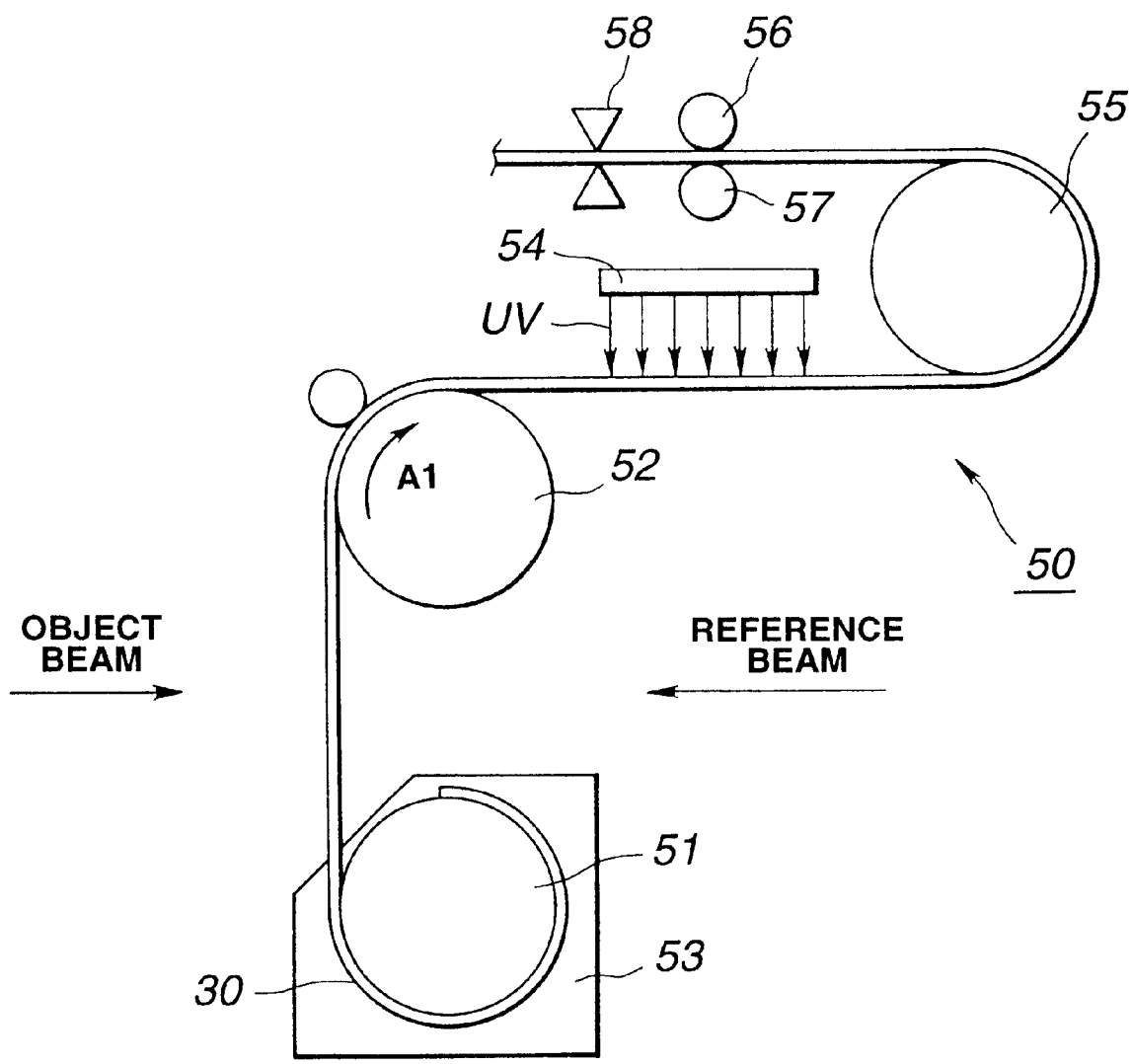
FIG. 6 is a model view showing an arrangement of a mechanism for feeding a recording medium.

Next, the recording medium feeding mechanism 50 will be discussed in detail with reference to FIG. 6. FIG. 6 is an expanded view showing the recording medium feeding mechanism 50 provided in the holographic stereogram printer apparatus 3.

As shown in FIG. 6, the recording medium feeding mechanism 50 includes a roller 51 and an intermittent feeding roller 52. The hologram recording medium 30 is stored in a film cartridge with the medium 30 wound around the roller 51. The recording medium feeding mechanism 50 is constructed to rotatively and axially support the roller 51 located in the film cartridge 53 mounted to a given position with a given amount of torque and hold the hologram recording medium 30 pulled out of the film cartridge 53 through the effect of the roller 51 and the intermittent feeding roller 52. The recording medium feeding mechanism 50 holds the hologram recording medium 30 so that the main face of the hologram recording medium 30 is substantially vertical to the object beam between the roller 51 and the intermittent feeding roller 52. The roller 51 and the intermittent feeding roller 52 are pulled against each other by a torsion coil spring. This pulling force applies given tension onto the hologram recording medium 30 loaded as bridged between the roller 51 and the intermittent feeding roller 52.

The intermittent feeding roller 52 of the mechanism 50 is connected to a stepping motor (not shown). The roller 52 is allowed to be rotated in the direction indicated by an arrow A1 of FIG. 6 based on the force of rotation transmitted from the stepping motor. This stepping motor serves to sequentially rotate the roller 52 by a given angle corresponding to one holographic element each time the exposure of one image is terminated. This rotation results in feeding the hologram recording medium 30 by one holographic element at each exposure of one image.

Further, an ultraviolet lamp 54 is located along the traveling path of the hologram recording medium 30 at a later stage of the intermittent feeding roller 52. This ultraviolet lamp 54 is used for completing the polymerization of the monomer M of the exposed hologram recording medium 30 and serves to apply an ultraviolet ray UV of a given power to the hologram recording medium 30 fed by the roller 52.

At a later stage of the ultraviolet lamp 54 along the traveling path of the hologram recording medium 30, a rotatively and axially supported heat roller 55, a pair of ejecting rollers 56 and 57, and a cutter 58 are located in the described order.

The ejecting rollers 56 and 57 serve to feed the hologram recording medium 30 so that the side of the cover sheet 30c of the hologram recording medium 30 is wound halfway around the heat roller 55 in a contacting state. The ejecting rollers 56 and 57 are connected to a stepping motor (not shown) and are rotated on the force of rotation transmitted from the stepping motor. The stepping motor serves to rotate the ejecting rollers 56 and 57 by a given angle corresponding to one holographic element each time the exposure of one image is terminated in synchronism with the rotation of the intermittent feeding roller 52 in response to a control signal S2 supplied from the control computer 2. This rotation allows the hologram recording medium 30 to positively feed around the heat roller 55 in a contact state without slacking the hologram recording medium 30 between the intermittent feeding roller 52 and the ejecting rollers 56 and 57.

The heat roller 55 provides a heating unit such as a heater inside of itself. This heating unit serves to keep the peripheral side at a temperature of about 120° C. Then, the heat roller 55 serves to head the photopolymer layer 30b of the hologram recording medium 30 being fed with the cover sheet 30c laid therebetween, for increasing a modulation of an refractive degree of the photopolymer layer 30b and fixing the recording image on the hologram recording medium 30. Hence, the heat roller 55 has an outer diameter selected so that the interval between the contact of the hologram recording medium 30 on the peripheral surface of the heat roller 55 and the release thereof is substantially similar to the interval when the recording image is fixed.

Further, the cutter 58 provides a cutter driving mechanism (not shown). By driving the cutter driving mechanism, the hologram recording medium 30 being fed to the cutter 58 can be cut out. This cutter driving mechanism operates to drive the cutter 58 when all of the image-recorded portion of the hologram recording medium 30 is ejected outside of the cutter 58 after all of each image formed on each image data piece of the parallax image series is recorded on the hologram recording medium 30 in response to a control signal S2 supplied from the control computer 2. This operation allows the portion where the image data is recorded to be cut out of the other portion and to be ejected outside as one holographic stereogram.

Finally, the description will be oriented to how the holographic stereogram creating system having the foregoing construction operates to create the holographic stereogram.

When creating the holographic stereogram, the control computer 2 operates to drive the display unit 41 based on the image data D5 supplied from the data processing unit 1 and display the image on the display unit 41. Then, the control computer 2 operates to send out the control signal S1 to the shutter 32 so that the shutter 32 is open for a given time for exposing the hologram recording medium 30. The laser beam L2 transmitted through the shutter, fired by the laser beam source 31, is partially reflected on the half mirror 33 and partially transmitted through the half mirror 33. The reflected beam L3 is entered as the reference beam into the hologram recording medium 30 through a light introducing block 37. The transmitted beam L4 is projected on the display unit 41 as projection light. This projection light is entered as the object beam into the hologram recording medium 30. This operation allows one image displayed on the display unit 41 to be recorded as a stripped holographic element on the hologram recording medium 30.

Then, on the termination of recording one image onto the holographic recording medium 30, the control computer 2 operates to send out the control signal S2 to the stepping motor connected to the intermittent feeding roller 52 and the stepping motor connected to the ejecting rollers 56 and 57 for driving them. At a time, based on the control signal supplied from the control computer 2, the stepping motor included in the diffuser panel moving mechanism is driven so that the diffuser panel 42 is moved randomly. In this embodiment, the diffuser panel 42 is moved in steps of about 0.5 mm in the width direction of the holographic element (in the arrow X direction). This operation allows the hologram recording medium 30 to be fed by one holographic element.

Next, the control computer 2 operates to drive the display unit 41 based on the next image data D5 supplied from the data processing unit 1 and display the next image on the display unit 41. Then, by sequentially repeating the similar operation, each image formed on each image data D5 supplied from the data processing unit 1 is sequentially recorded as striped holographic elements on the hologram recording medium 30.

That is, this holographic stereogram creating system is arranged so that the image formed on the image data recorded in the recording unit 12 is sequentially displayed on the display unit 41, the shutter 32 is open for each image, and each image is sequentially recorded as a striped holographic element on the hologram recording medium 30. At this time, the hologram recording medium 30 is fed by one holographic element for each image. Hence, the holographic elements are sequentially arranged in the horizontal (lateral) direction. This arrangement allows a plurality of images containing the horizontal parallax information to be recorded as laterally sequential holographic elements on the hologram recording medium 30. This results in providing the holographic stereogram with the horizontal parallax.

Then, the ultraviolet ray UV is applied from the ultraviolet lamp 54 onto the hologram recording medium 30 on which the holographic elements are recorded. This application completes the polymerization of the monomer M. Next, the hologram recording medium 30 is heated by the heat roller 55 for fixing the recording image.

Then, when all of the portion where the image is recorded is ejected outside, the control computer 2 operates to supply the control signal S2 to the cutter driving mechanism for driving the mechanism. This results in cutting the portion where the image is recorded of the hologram recording medium 30 by the cutter 58 and then ejecting it as one holographic stereogram.

The foregoing process completes the holographic stereogram provided with the horizontal parallax.

The foregoing description has concerned with the embodiments of the present invention. However, the present invention is not limited to the foregoing embodiments and may be transformed in various forms.

For example, the foregoing description has concerned with the holographic stereogram provided with only the horizontal parallax (that is, the stripped holographic element). Similarly, the present invention may apply to the holographic stereogram having horizontal and vertical parallaxes and stripped holographic elements.

Further, the foregoing description has concerned with the reflective hologram. The present invention may apply to a passive hologram or an edge-lit hologram.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for creating a holographic stereogram, comprising the steps of:

displaying an image corresponding to a coordinate location of a hologram recording medium on a display means;

condensing an object beam onto said coordinate location of the hologram recording medium, wherein the object beam is a laser beam transmitted through said display means;

applying a reference beam onto said hologram recording medium, wherein the reference beam is a part of the laser beam before transmission through said display means;

moving a first diffuser panel that diffuses the laser beam; and sequentially forming striped or dotted holographic elements on said hologram recording medium, wherein the first diffuser panel for diffusing the laser beam is located close to the display unit and a mask and a second diffuser panel are located before said hologram recording medium, the mask having an opening corresponding to each holographic element shape and said second diffuser panel one-dimensionally diffuses the object beam transmitted through the opening.

2. The method of claim 1, wherein the moving step is conducted each time a holographic element of the holographic stereogram is formed.

3. The method of claim 1, wherein the moving step includes moving the first diffuser panel in at least one of a width direction of the holographic element and a direction perpendicular to the width direction of the holographic element.

4. The method of claim 1, wherein the moving step includes moving the first diffuser panel in a random direction.

5. The method of claim 1, wherein the moving step includes moving the first diffuser panel in a reciprocating motion.

6. An apparatus for creating a holographic stereogram, comprising:

display means for displaying an image corresponding to a location of a hologram recording medium;

a laser beam source for transmitting a laser beam to be transmitted through said display means onto the hologram recording medium as an object beam and for transmitting part of the laser beam onto the hologram recording medium as a reference beam before transmitting through said display means;

a first diffuser panel located near said display means for diffusing said laser beam;

means for moving said first diffuser panel;

a mask having an opening corresponding to a shape of a holographic element, said mask being located before said hologram recording medium; and a second diffuser panel for one-dimensionally diffusing the object beam transmitted through the opening of said mask.

7. The apparatus of claim 6, wherein said moving means moves said first diffuser panel each time a holographic element of the holographic stereogram is formed.

8. The apparatus of claim 6, wherein the moving means moves the first diffuser panel in at least one of a width direction of the holographic element and a direction perpendicular to the width direction of the holographic element.

9. The apparatus of claim 2, wherein the moving means moves the first diffuser panel in a random direction.

10. The apparatus of claim 6, wherein the moving means moves the first diffuser panel in a reciprocating motion.

\* \* \* \* \*